US011265594B2

(12) United States Patent
Luo

(10) Patent No.: US 11,265,594 B2
(45) Date of Patent: Mar. 1, 2022

(54) DATA PROCESSING METHOD AND DEVICE, STORAGE MEDIUM, ELECTRONIC DEVICE

(71) Applicant: NETEASE (HANGZHOU) NETWORK CO., LTD., Hangzhou (CN)

(72) Inventor: Chuang Luo, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/057,768

(22) PCT Filed: Aug. 22, 2019

(86) PCT No.: PCT/CN2019/102051
§ 371 (c)(1),
(2) Date: Nov. 23, 2020

(87) PCT Pub. No.: WO2020/177278
PCT Pub. Date: Sep. 10, 2020

(65) Prior Publication Data
US 2021/0409809 A1    Dec. 30, 2021

(30) Foreign Application Priority Data
Mar. 5, 2019  (CN) .......................... 201910165365.2

(51) Int. Cl.
*H04N 21/431* (2011.01)
*H04N 21/2187* (2011.01)
(Continued)

(52) U.S. Cl.
CPC ..... *H04N 21/4312* (2013.01); *H04N 21/2187* (2013.01); *H04N 21/2743* (2013.01); *H04N 21/478* (2013.01); *H04N 21/8547* (2013.01)

(58) Field of Classification Search
CPC .......... H04N 21/4312; H04N 21/2187; H04N 21/2743; H04N 21/8547; H04N 21/478
See application file for complete search history.

(56) References Cited

U.S. PATENT DOCUMENTS 9,619,105 B1 *   4/2017   Dal Mutto .............. G06F 3/011
10,593,059 B1 *  3/2020   Liu .................... H04N 21/4402
(Continued)

FOREIGN PATENT DOCUMENTS

| CN | 101035279 A | 9/2007 |
| CN | 101889274 A | 11/2010 |

(Continued)

OTHER PUBLICATIONS

The ISR issued Nov. 28, 2019 by the WIPO.
The CN1OA issued Dec. 3, 2019 by the CNIPA.

*Primary Examiner* — Oschta I Montoya
(74) *Attorney, Agent, or Firm* — Qinghong Xu

(57) ABSTRACT

The present disclosure belongs to the field of computer technology and relates to a data processing method and device, a computer-readable storage medium, and an electronic device. The method includes: determining an image frame of video data, and acquiring position information of a function area located in the image frame; acquiring coding information of the function area, and establishing a first mapping relationship between the coding information and the position information; and acquiring a time stamp of the image frame, and establishing a second mapping relationship between the time stamp and the first mapping relationship.

7 Claims, 19 Drawing Sheets

(51) Int. Cl.
*H04N 21/2743* (2011.01)
*H04N 21/8547* (2011.01)
*H04N 21/478* (2011.01)

(56) References Cited

U.S. PATENT DOCUMENTS

| | | | |
|---|---|---|---|
| 10,937,237 B1 * | 3/2021 | Kim | G06N 3/0472 |
| 2008/0008451 A1 * | 1/2008 | Ikeda | G11B 27/329 |
| | | | 386/336 |
| 2015/0126279 A1 * | 5/2015 | Lyons | G07F 17/3218 |
| | | | 463/33 |
| 2015/0181085 A1 | 6/2015 | Xu | |
| 2016/0210669 A1 | 7/2016 | Xin et al. | |
| 2017/0134656 A1 * | 5/2017 | Burgess | H04N 5/2628 |
| 2019/0317974 A1 * | 10/2019 | Chamberlin | G06F 16/9537 |

FOREIGN PATENT DOCUMENTS

| | | |
|---|---|---|
| CN | 102782629 A | 11/2012 |
| CN | 105580355 A | 5/2016 |
| CN | 106254941 A | 12/2016 |
| CN | 108401173 A | 8/2018 |
| CN | 108769808 A | 11/2018 |
| CN | 109194978 A | 1/2019 |
| CN | 109874026 A | 6/2019 |

\* cited by examiner

DATA PROCESSING METHOD AND DEVICE, STORAGE MEDIUM, ELECTRONIC DEVICE

CROSS-REFERENCE

The present application is based upon International Application No. PCT/CN2019/102051, filed on Aug. 22, 2019, which is based upon and claims priority of Chinese patent application No. 201910165365.2, filed on Mar. 5, 2019, the contents of which are hereby incorporated by reference in its entirety.

TECHNICAL FIELD

The present disclosure relates to the field of computer technology, and in particular, to a data processing method and a data processing device, a computer-readable storage medium, and an electronic device.

BACKGROUND

There are more and more functions of online live broadcast software, and there are two commonly used methods for introducing software functions. One method is to make software tutorials, and arrange each function of the software in the form of documents or web pages for users to check by themselves; the other method is to add explanatory text at an entrance of the software function. Although these two methods have their applicability to a certain extent, they have corresponding defects. In view of this, there is an urgent need in the art to develop a new data processing method and device.

It should be noted that the information disclosed in the Background section above is only for enhancing the understanding of the background of the present disclosure, and thus may include information that does not constitute prior art known to those of ordinary skill in the art.

SUMMARY

The purpose of the present disclosure is to provide a data processing method, a data processing device, a computer-readable storage medium, and an electronic device, and to overcome, at least to a certain extent, the problem of insufficient perception of software functions due to limitations of the related art.

Other features and advantages of the present disclosure will become apparent through the following detailed description, or partly be learned through the practice of the present disclosure.

According to a first aspect of an embodiment of the present disclosure, a data processing method is provided, which is applied to a host end of a live streaming. The method includes: determining an image frame of video data, and acquiring position information of a function area located in the image frame; acquiring coding information of the function area, and establishing a first mapping relationship between the coding information and the position information; and acquiring a time stamp of the image frame, and establishing a second mapping relationship between the time stamp and the first mapping relationship.

According to a second aspect of an embodiment of the present disclosure, a data processing device is provided, the device includes: an information acquisition component, configured to determine an image frame of video data, and acquire position information of a function area located in the image frame; a first mapping component, configured to acquire coding information of the function area, and establish a first mapping relationship between the coding information and the position information; and a second mapping component, configured to acquire a time stamp of the image frame, and establish a second mapping relationship between the time stamp and the first mapping relationship.

According to a third aspect of an embodiment of the present disclosure, a data processing method is provided, which is applied to a viewer end of a live streaming. The method includes: determining an image frame in video data, and receiving a touch operation acting on the image frame; acquiring a time stamp of the image frame, and touch position information of the touch operation acting on the image frame; acquiring a first mapping relationship corresponding to the time stamp based on a second mapping relationship; and acquiring coding information corresponding to the touch position information based on the first mapping relationship, and performing a function corresponding to a function area indicated by the coding information, wherein the first mapping relationship includes a mapping relationship between the coding information of the function area and position information of the function area in the image frame, and the second mapping relationship includes a mapping relationship between the time stamp of the image frame.

According to a fourth aspect of an embodiment of the present disclosure, a data processing device is provided, the device includes: an instruction receiving component, configured to determine an image frame in video data, and receive a touch operation acting on the image frame; an instruction information component, configured to acquire a time stamp of the image frame, and touch position information of the touch operation acting on the image frame; a first acquisition component, configured to acquire a first mapping relationship corresponding to the time stamp based on a second mapping relationship; and a second acquisition component, configured to acquire coding information corresponding to the touch position information based on the first mapping relationship, and perform a function corresponding to a function area indicated by the coding information. The first mapping relationship includes a mapping relationship between the coding information of the function area and position information of the function area in the image frame, and the second mapping relationship includes a mapping relationship of the time stamp of the image frame.

According to a fifth aspect of an embodiment of the present disclosure, a data processing method is provided, the method includes: acquiring a first mapping relationship between a time stamp of an image frame in video data and an area in the image frame where instructions are acceptable; determining whether a first mapping relationship corresponding to a time stamp of an image frame is consistent with a first mapping relationship corresponding to a time stamp of a next image frame; and integrating the two first mapping relationships corresponding to the image frame and the next frame image respectively into one first mapping relationship, if the first mapping relationship corresponding to the time stamp of the image frame is consistent with the first mapping relationship corresponding to the time stamp of the next image frame.

According to a sixth aspect of an embodiment of the present disclosure, a data processing device is provided, the device includes: a relationship acquisition component, configured to acquire a first mapping relationship between a time stamp of an image frame in video data and an area in the image frame where touch operations are acceptable; a mapping determining component, configured to determine whether a first mapping relationship corresponding to a time stamp of an image frame is consistent with a first mapping relationship corresponding to a time stamp of a next image frame; and a relationship integration component, configured to integrate the two first mapping relationships corresponding to the image frame and the next frame image respectively into one first mapping relationship, if the first mapping relationship corresponding to the time stamp of the image frame is consistent with the first mapping relationship corresponding to the time stamp of the next image frame.

According to a seventh aspect of an embodiment of the present disclosure, an electronic device is provided, including: a processor and a memory; wherein the memory is coupled to the processor and is configured to store computer-readable instructions. The computer-readable instructions, when executed by the processor, implement the data processing method in any of the above exemplary embodiments.

According to an eighth aspect of an embodiment of the present disclosure, there is provided a computer-readable storage medium having a computer program stored thereon. The computer program, when executed by a processor, implements the data processing method in any of the above exemplary embodiments.

It should be noted that the above general description and the following detailed description are merely exemplary and explanatory and should not be construed as limiting of the disclosure.

DETAILED DESCRIPTION

Figure 1:
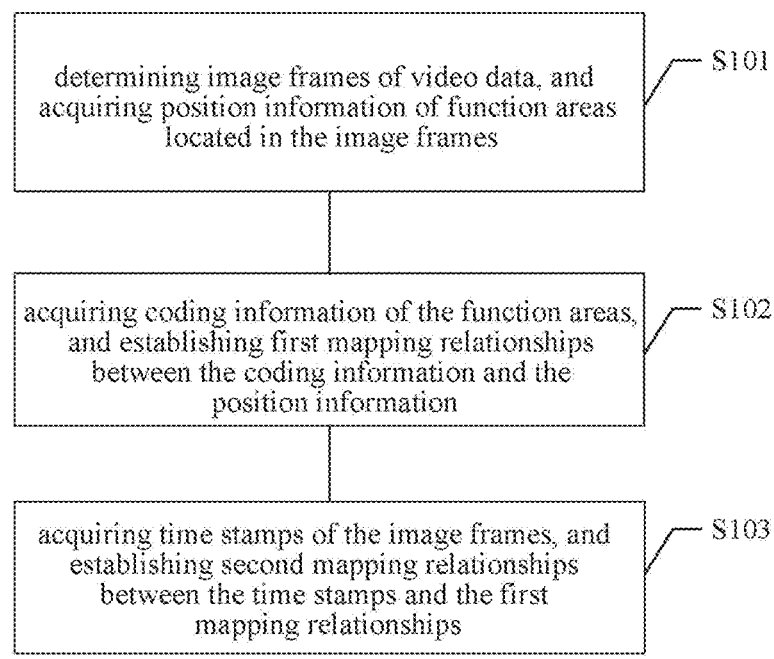
FIG. 1 schematically shows a schematic flowchart of a data processing method in an exemplary embodiment of the present disclosure.

Example embodiments will now be described more fully with reference to the accompanying drawings. However, the example embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics may be combined in one or more embodiments in any suitable manner. In the following description, many specific details are provided to give a full understanding of the embodiments of the present disclosure. However, those skilled in the art will appreciate that the technical solution of the present disclosure may be practiced without one or more of the specific details, or other methods, components, device, steps and the like may be employed. In other instances, well-known technical solutions are not shown or described in detail to avoid obscuring various aspects of the present disclosure.

In the specification, the terms "one", "a", "the" and "said" are used to indicate that there are one or more elements/components or the like; the terms "include" and "have" are used to indicate an open type meaning of including and means that there may be additional elements/components/etc. in addition to the listed elements/components/etc.; the terms "first" and "second" etc. are used only as markers, and do not limit the number of objects.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities.

In view of the problems in the related art, the present disclosure proposes a data processing method. FIG. 1 shows a flowchart of the data processing method. As shown in FIG. 1, the data processing method includes at least the following steps.

In step S101, image frames of video data are determined, and position information of a function area located in the image frames is acquired.

In step S102, coding information of the function area is acquired, and a first mapping relationship between the coding information and the position information is established.

In step S103, time stamps of the image frames are acquired, and a second mapping relationship between the time stamp and the first mapping relationship is established.

In an exemplary embodiment of the present disclosure, by establishing a corresponding mapping relationship between the function area in the screen of the host end of the live streaming and the software function, the viewers can perform the touch operation on the function area (the function area can be designated by the anchor during the live streaming, or an area automatically set by the live streaming software/live streaming server) under the guidance of the anchor, thereby achieving the effect of enabling the corresponding function of the software. On the one hand, the problem of small function perception of some software is solved to improve the correlation and interaction between the viewers and the software functions of the live streaming software, and facilitate the retention of users; on the other hand, blocking the video screen of the viewer end is avoided while numerous functional operation areas are realized in the limited display layout of the live streaming software; on still the other hand, a new interactive method is provided for the host end and the viewer end of the live streaming, thereby increasing fun of the live streaming and enhancing the viewing experience of the viewer.

Each step of the data processing method will be described in detail below.

In step S101, image frames of video data are determined, and position information of a function area located in the image frames is acquired.

In the exemplary embodiment of the present disclosure, the video data itself is composed of successive image frames, one frame image is one still picture, and the successive image frames form a video. In the video data, if there are more frames in per second, the displayed picture will be smoother and more realistic; if there are fewer frames in per second, the video picture will be displayed incoherently, and the smoothness will be lower. For example, the video data may be composed of 60 image frames or 80 image frames. Both of them can display the same content, but there will be a clear difference in the smoothness of the video data. The method for determining the image frames of the video data may be to decompose the video data. This exemplary embodiment does not limit the number of image frames included in the video data. For example, if the video data includes 4 image frames, the video data can be decomposed into 4 image frames. In addition, the exemplary embodiment does not limit the format of the video data, which can be real-time live video data, or video data in mp4, avi, mkv, dvd, flv and other formats, or a video file in other formats, or can also include single-channel gray-scale video data and three-channel color video data.

Figure 2:
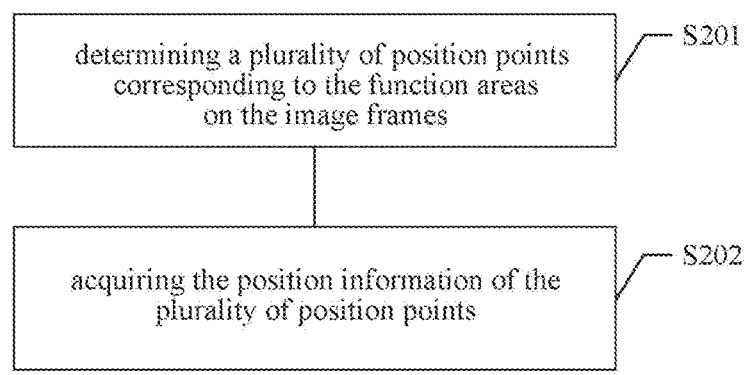
FIG. 2 schematically shows a schematic flowchart of a method for acquiring position information of a function area in one of exemplary embodiments of the present disclosure.

To determine the position of the function area in the video frame, it can be done by a screen coordinate system. The screen coordinate system takes the lower left corner of the screen as the origin and takes the pixel as a unit, and the coordinate axis extends towards the upper left without exceeding the maximum width and maximum height of the screen. The position information of the function area in the image frame can be determined according to the corresponding pixels of the function area in the screen coordinate system. The function area may be an area selected by the anchor end during the live broadcast, or may be an area automatically set by the host end software or the live broadcast server. The present exemplary embodiment does not specifically limit the attributes of the function area, such as the specific determination method and the shape of the function area. In an optional embodiment, FIG. 2 shows a schematic flowchart of a method for acquiring position information of a function area located in an image frame. As shown in FIG. 2, the method includes at least the following steps: in step S201, a plurality of position points corresponding to the function area is determined on the image frame. The function area may be composed of a plurality of position points, and each position point may be determined in the image frame. In step S202, position information of the plurality of position points is acquired. Since these position points are established based on the screen coordinate system, the position information of each position point can be determined by the corresponding pixel value of the screen coordinate system, to determine the position information of the function area. For example, the position information of the plurality of position points is (1,2), (1,3), (2,2) and (2,3) respectively, then it can be determined that the function area is a square with a side length of 1, the coordinates of the four points of which have been determined. The coordinate information of the function area is unique and determined. This exemplary embodiment does not specifically limit the specific method of determining the position information of the function area by the position points, and the determination can be carried out according to the actual situation.

Figure 3:
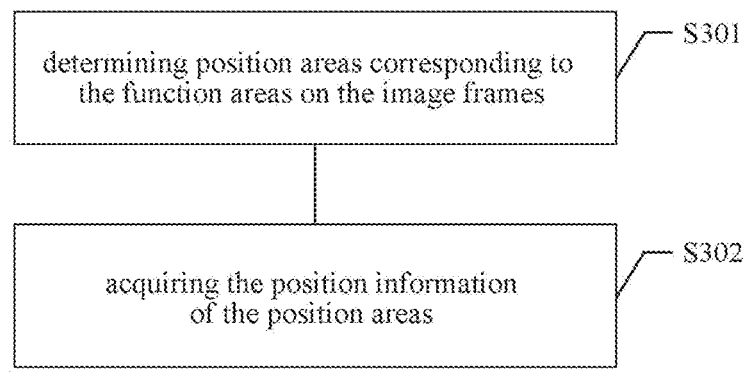
FIG. 3 schematically shows a schematic flowchart of another method for acquiring position information of a function area in one of exemplary embodiments of the present disclosure.

In an optional embodiment, FIG. 3 shows a schematic flowchart of another method for acquiring position information of a function area located in an image frame. As shown in FIG. 3, the method includes at least the following steps: in step S301, a position area corresponding to the function area is determined on the image frame. The function area may be an area with a corresponding function, which corresponds to a position area in the screen coordinate system of the image frame. In step S302, position information of the position area is acquired. Through the pixel value of the screen coordinate system, the position information of the position area can be determined. For example, the position information of the position area of the function area may be (1, 2, 3, 4), indicating that the function area is a position area with a coordinate (1,2) as a starting point, a width of 3, and a height of 4, and the unit of the position area is the pixel value. In the two optional embodiments shown in FIG. 2 and FIG. 3, the corresponding method for determining the position information of the function area can be selected for different settings of the function area, which is more targeted and the determined position information is more accurate.

In step S102, coding information of the function area is acquired, and a first mapping relationship between the coding information and the position information is established.

In an exemplary embodiment of the present disclosure, the function area is an area that has been functionally coded, and the coding information of the function area can be acquired. The first mapping relationship between the acquired position information and coding information of the function area may be established. For example, the form of the first mapping relationship may be a mapping relationship set R of the function area and the coding information, and the specific form of R can be as follows: ((x1, y1, width1, height1)→code1, (x2, y2, width2, height2)→code2, ... ). It is worth noting that this exemplary embodiment does not specifically limit the specific form of the first mapping relationship.

In step S103, a time stamp of the image frame is acquired, and a second mapping relationship between the time stamp and the first mapping relationship is established.

In an exemplary embodiment of the present disclosure, the time stamp is usually a character sequence that uniquely identifies the time at a certain moment, and the time stamp of the image frame can uniquely identify the playing time of the image frame at a certain moment. The character sequence refers to a series of characters composed of numbers, letters, and underlines. When the image frames of the video data are determined according to step S101, the time stamps of the image frames can be uniquely determined. After the first mapping relationship of the function area in the image frame is established in step S102, a second mapping relationship between the first mapping relationship and the time stamp of the image frame may be established. For example, the form of the second mapping relationship may be the time stamp and the first mapping relationship F, and the specific form of F may be in the following manner: (timestamp→R). The specific form of the second mapping relationship is not particularly limited in this exemplary embodiment.

Figure 4:
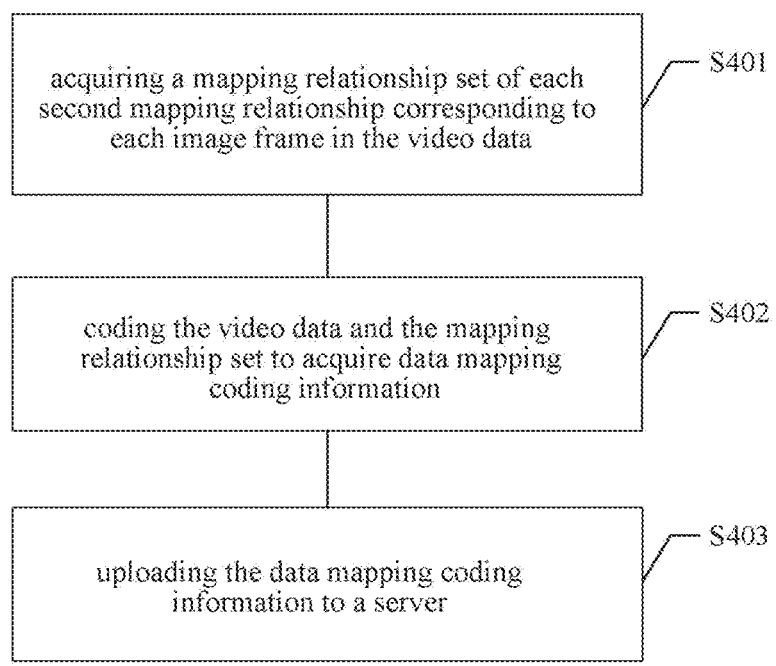
FIG. 4 schematically shows a schematic flowchart of a method for processing a second mapping relationship in one of exemplary embodiments of the present disclosure.

In the exemplary embodiment of the present disclosure, FIG. 4 shows a schematic flowchart of a processing method after a second mapping relationship is established. As shown in FIG. 4, the method includes at least the following steps: in step S401, a mapping relationship set of each second mapping relationship corresponding to each image frame in the video data is acquired. The second mapping relationship corresponding to each image frame can be determined according to steps S101-S103. The video data includes a plurality of image frames, so a plurality of second mapping relationships can also be determined. All the second mapping relationships in the video data can be collected, to determine the mapping relationship set of the video data. In step S402, the video data and the mapping relationship set are coded to acquire data mapping coding information. Coding is performed on the video data and the mapping relationship, and the data mapping coding information is acquired according to the result of the coding. In step S403, the data mapping coding information is uploaded to the server. In order to facilitate the viewer end to acquire the video data and the mapping relationship set, the data mapping coding information acquired after coding can be uploaded to the server. In this exemplary embodiment, the video data and the mapping relationship set are coded and uploaded to the server end at the same time. The video data and the mapping relationship set can be coded into data mapping coding information, so that there exists an unique and determined relationship between the mapping relationship set and the video data saved in the server end, and when decoding processing is performed at the viewer end, it facilitates query.

Figure 5:
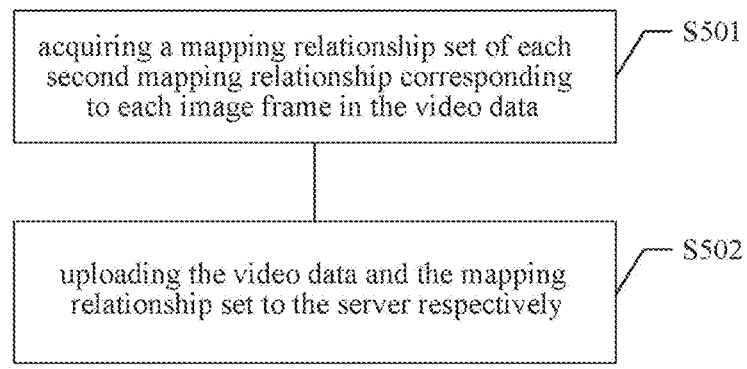
FIG. 5 schematically shows a schematic flowchart of another method for processing a second mapping relationship in one of exemplary embodiments of the present disclosure.

In another exemplary embodiment of the present disclosure, FIG. 5 shows a schematic flowchart of another processing method after a second mapping relationship is established. As shown in FIG. 5, the method includes at least the following steps: in step S501, a mapping relationship set of each second mapping relationship corresponding to each image frame in the video data is acquired. The second mapping relationship corresponding to each image frame can be determined according to steps S101-S103. The video data includes a plurality of image frames, so a plurality of second mapping relationships can also be determined. All the second mapping relationships in the video data can be collected to determine the mapping relationship set of the video data. In step S502, the video data and the mapping relationship set are uploaded to the server respectively. In order to facilitate the viewer end to acquire the video data and the mapping relationship set, the video data and the mapping relationship set can be uploaded respectively. In an exemplary embodiment of the present disclosure, uploading the video data and the mapping relationship set respectively can make it easier for the viewer end to query the function coding information, to more quickly complete the demand for executing the corresponding software function, and improve experience of the viewer.

Figure 6:
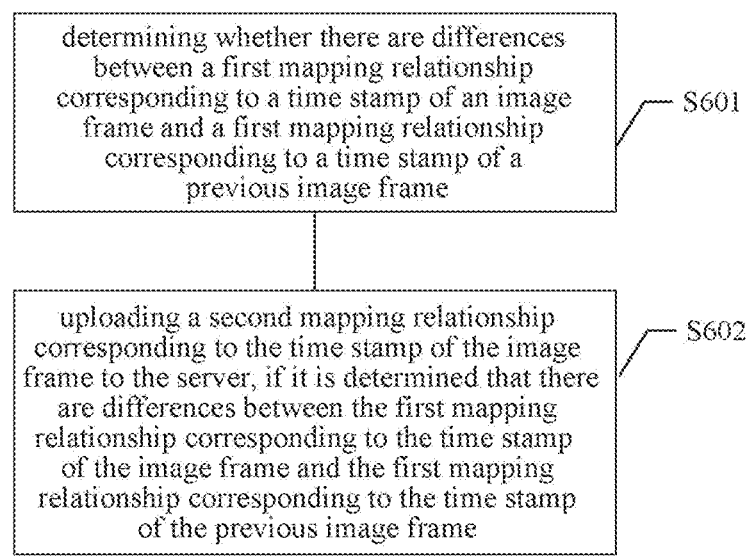
FIG. 6 schematically shows a schematic flowchart of a method for uploading video data and a second mapping relationship respectively in one of exemplary embodiments of the present disclosure.

In an optional embodiment, FIG. 6 shows a schematic flowchart of a method for uploading video data and a second mapping relationship respectively. As shown in FIG. 6, the method includes at least the following steps: in step S601, it is determined whether there are differences between a first mapping relationship corresponding to a time stamp of an image frame and a first mapping relationship corresponding to a time stamp of a previous image frame. Since there is a one-to-one correspondence between the time stamp and the image frame and each image frame has a corresponding first mapping relationship, there is a one-to-one correspondence between the time stamp and the first mapping relationship. However, since the division of the image frame may be too fine, there may be a case where there is no difference between the first mapping relationship corresponding to the time stamp of the image frame and the first mapping relationship corresponding to the time stamp of the previous image frame. To facilitate uploading and saving time and resources, it may be determined whether there are differences between a first mapping relationship corresponding to a time stamp of an image frame and a first mapping relationship corresponding to a time stamp of a previous image frame. In step S602, if it is determined that there are differences between the first mapping relationship corresponding to the time stamp of the image frame and the first mapping relationship corresponding to the time stamp of the previous image frame, a second mapping relationship corresponding to the time stamp of the image frame is uploaded to the server. If it is determined that there are differences between the first mapping relationship corresponding to the time stamp of the image frame and the first mapping relationship corresponding to the time stamp of the previous image frame, the mapping relationship corresponding to the time stamp is uploaded; if it is determined that there is no difference between the first mapping relationship corresponding to the time stamp of the image frame and the first mapping relationship corresponding to the time stamp of the previous image frame, the first mapping relationships associated with the successive time stamps can be merged. For example, in the video data with 100 frames, if the first mapping relationships of the image frames from 1 to 100 are the same, only one corresponding storage record is saved, that is, only the second mapping relationship corresponding to the first image frame is uploaded to the server. In an exemplary embodiment of the present disclosure, the video data and the mapping relationship set are uploaded respectively, and before uploading, it can be determined whether there are differences between the first mapping relationship corresponding to the time stamp of this moment and the first mapping relationship corresponding to the time stamp of the previous moment. Only when the differences exist, the uploading is performed, which not only saves the workload and time for uploading to the server, but also saves the resources of the server. It is a more preferred solution for uploading to the server.

Figure 7:
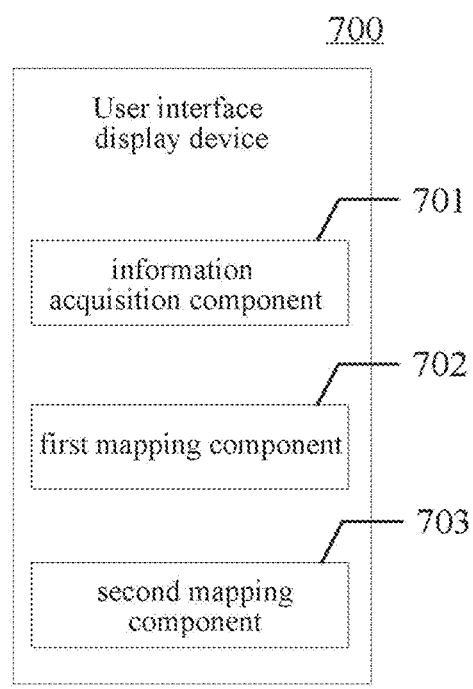
FIG. 7 schematically shows a schematic structural diagram of a data processing device in one of exemplary embodiments of the present disclosure.

In addition, in the exemplary embodiment of the present disclosure, a data processing device is also provided. FIG. 7 shows a schematic structural diagram of a data processing device. As shown in FIG. 7, the data processing device 700 may include; an information acquisition component 701, a first mapping component 702, and a second mapping component 703.

The information acquisition component 701 is configured to determine image frames of video data, and acquire position information of a function area located in the image frames; the first mapping component 702 is configured to acquire coding information of the function area, and establish a first mapping relationship between the coding information and the position information; and the second mapping component 703 is configured to acquire a time stamp of the image frames, and establish a second mapping relationship between the time stamp and the first mapping relationship.

The specific details of the above data processing device have been described in detail in the corresponding data processing method, so they will not be repeated here.

Figure 8:
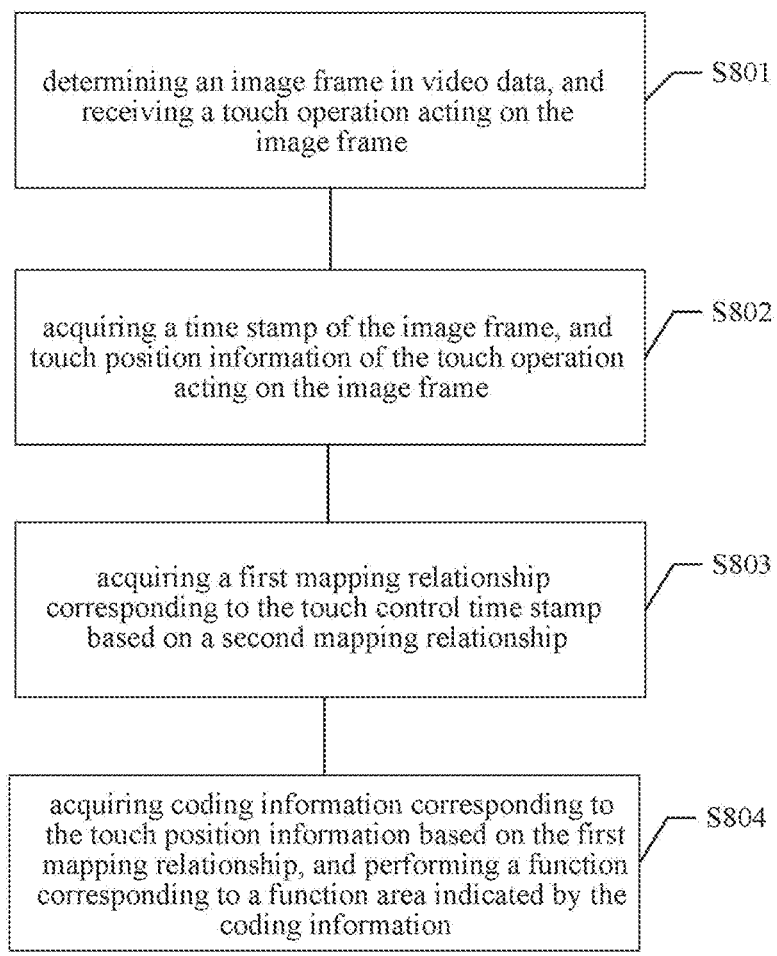
FIG. 8 schematically shows a schematic flowchart of another data processing method in one of exemplary embodiments of the present disclosure.

It should be noted that although several modules or units of the data processing device 700 are described above in detail, such division of the modules or units is not mandatory. In fact, according to exemplary embodiments of the present disclosure, the features and functions of two or more modules or units described above may be embodied in one module or unit. Conversely, the features and functions of one module or unit described above can be further divided into multiple modules or units In view of the problems in the related art, the present disclosure also proposes another data processing method, which is applied to a viewer end of live streaming. FIG. 8 shows a schematic flowchart of the data processing method. As shown in FIG. 8, the data processing method at least includes following steps.

In step S801, image frames in video data are determined, and a touch operation acting on the image frame is received.

In step S802, a time stamp of the image frame and touch position information of the touch operation acting on the image frame are acquired.

In step S803, a first mapping relationship corresponding to the time stamp is acquired based on a second mapping relationship.

In step S804, coding information corresponding to the touch position information is acquired based on the first mapping relationship, and a function corresponding to a function area indicated by the coding information is performed. The first mapping relationship includes a mapping relationship between the coding information of the function area and position information of the function area in the image frame, and the second mapping relationship includes a mapping relationship of the time stamp of the image frame.

In an exemplary embodiment of the present disclosure, by establishing a corresponding mapping relationship between the function area in the screen of the host end of the live streaming and the software function, the viewer end can perform the touch operation on the function area under the guidance of the anchor, thereby achieving the effect of enabling the corresponding function of the software. On the one hand, the touch position information of the touch operation of the viewer can be captured accurately to perform the software function of the corresponding area, which solves the problem of small function perception of some software, improves the correlation and interaction between the viewers and the software functions of the live broadcast software, and facilitates the retention of users; on the other hand, blocking the video screen of the viewer end is avoided while numerous functional operation areas are realized in the limited display layout of the live broadcast software, which provides better visual effects to the viewer end; on still the other hand, a new interactive method is provided for the host end and the viewer end of the live streaming, thereby increasing fun of the live streaming and enhancing viewing experience of the viewer.

Each step of the data processing method will be described in detail below.

In step S801, image frames in video data are determined, and a touch operation acting on the image frame is received.

In the exemplary embodiment of the present disclosure, the video data itself is composed of successive image frames, one frame image is one still picture, and the successive image frames form a video. In the video data, if there are more frames in per second, the displayed picture will be smoother and more realistic; if there are fewer frames in per second, the video picture will be displayed incoherently, and the smoothness will be lower. For example, the video data may be composed of 60 image frames or 80 image frames. Both of them can display the same content, but there will be a clear difference in the smoothness of the video data. The method for determining the image frames of the video data may be to decompose the video data. This exemplary embodiment does not limit the number of image frames included in the video data. For example, if the video data includes 4 image frames, the video data can be decomposed into 4 image frames. In addition, the exemplary embodiment does not limit the format of the video data, which can be real-time live video data, or video files in mp4, avi, mkv, dvd, flv and other formats, or video data in other formats, or can also include single-channel gray-scale video data and three-channel color video data. One image frame in the video data is determined, and the touch operation acting on the image frame is received. The touch operation may be a click operation, a sliding operation, a press operation, etc. The present exemplary embodiment does not specifically limit the specific touch operation.

In step S802, a time stamp of the image frame and touch position information of the touch operation acting on the image frame are acquired.

In an exemplary embodiment of the present disclosure, the time stamp is usually a character sequence that uniquely identifies the time at a certain moment, and the time stamp of the image frame can uniquely identify the playing time of the image frame at a certain moment. When the image frames of the video data are determined, the time stamps of the image frames can be uniquely determined. The touch position information of the touch operation in the image frame can be determined by the screen coordinate system. The screen coordinate system takes the lower left corner of the screen as the origin and takes the pixel as a unit, and the coordinate axis extends towards the upper left without exceeding the maximum width and maximum height of the screen. The touch position information can be determined according to the corresponding pixel of the touch operation in the screen coordinate system. The touch position information may be position information of multiple touch points. For example, the position information of multiple position points is acquired to determine the touch position information. Since these position points are established based on the screen coordinate system, the position information of each position point can be determined by the corresponding pixel value of the screen coordinate system to determine the touch position information. For example, the position information of the plurality of position points is (1, 2), (1, 3), (2, 2) and (2, 3), then it can be determined that the area where the touch operation acts is a square with a side length of 1, the coordinates of the four points of which have been determined. The coordinate information of the touch position can be uniquely determined. The touch position information may be the position information of the touch area, and the position information of the touch area can be determined by the pixel values of the screen coordinate system. For example, the position information of the touch area may be (1, 2, 3, 4), indicating that the touch area is a position area with a coordinate (1, 2) as a starting point, a width of 3, and a height of 4, and the unit of the position area is the pixel value. The touch position information may be determined according to the position information of (1, 2, 3, 4), and the touch position information is uniquely determined in the image frame.

In step S803, a first mapping relationship corresponding to the time stamp is acquired based on a second mapping relationship.

Figure 9:
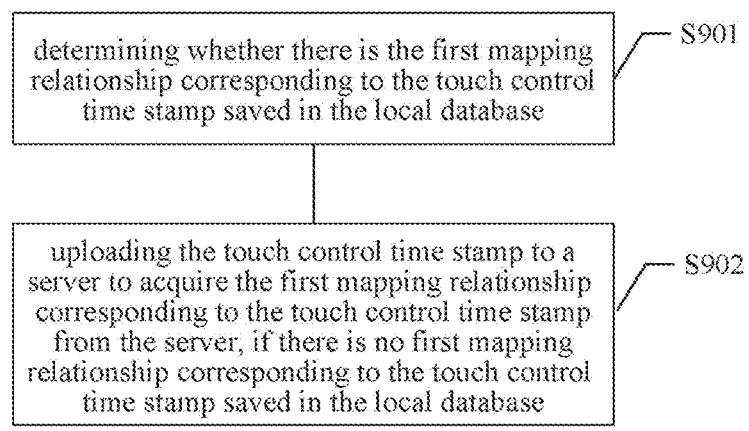
FIG. 9 schematically shows a schematic flowchart of a method for acquiring a first mapping relationship corresponding to a time stamp in one of exemplary embodiments of the present disclosure.

In the exemplary embodiment of the present disclosure, FIG. 9 shows a schematic flowchart of a method for acquiring a first mapping relationship corresponding to a time stamp based on a second mapping relationship. As shown in FIG. 9, the method includes at least the following steps: in step S901, it is determined whether there is the first mapping relationship corresponding to the time stamp saved in the local database. When the viewer end decodes the video data, after the time stamp of the video data is acquired, the viewer end requests the server to acquire the first mapping relationship by using the time stamp. In order to reduce the amount of requests, the server end will send all the second mapping relationships of the video data together to the viewer end to facilitate subsequent decoding. The second mapping relationship includes a mapping relationship between time stamps of image frames. For example, the form of the second mapping relationship may be a time stamp and a first mapping relationship F (timestamp→R). Therefore, when decoding, the viewer end will first query whether there is the first mapping relationship corresponding to the time stamp saved in the local database. If there is the first mapping relationship corresponding to the time stamp saved in the local database, the first mapping relationship may be directly acquired. In step S902, if there is no first mapping relationship corresponding to the time stamp saved in the local database, the time stamp is uploaded to a server to acquire the first mapping relationship corresponding to the time stamp from the server. If there is no first mapping relationship corresponding to the time stamp queried from the local database, a request is sent to the server, the time stamp is uploaded to the server, and the first mapping relationship corresponding to the time stamp is acquired from the server. In an exemplary embodiment of the present disclosure, only when the first mapping relationship corresponding to the timestamp is not saved in the local database, the corresponding first mapping relationship is queried from the server end through the uploaded timestamp, thereby reducing the amount of access of the viewer end to the server end and saving the concurrent resources of the server end.

In step S804, coding information corresponding to the touch position information is acquired based on the first mapping relationship, and a function corresponding to a function area indicated by the coding information is performed. The first mapping relationship includes a mapping relationship between the coding information of the function area and position information of the function area in the image frame, and the second mapping relationship includes a mapping relationship between the time stamps of the image frames.

In an exemplary embodiment of the present disclosure, the first mapping relationship includes a mapping relationship between the coding information of the function area and position information of the function area in the image frame. The form of the first mapping relationship may be a mapping set R ((x1, y1, width1, height1)→code1, (x2, y2, width2, height2)→code2, . . . ) of the function area and the coding information. The form of the first mapping relationship is not particularly limited in this exemplary embodiment. According to the acquired first mapping relationship, the coding information of the corresponding function area can be acquired according to the touch position information, and the coding information can be executed to enable the viewer end to realize the corresponding function. The function area may be designated by the anchor during the live broadcast, or may be automatically set by the live broadcast software/live broadcast server. The exemplary embodiment does not specifically limit the specific determination form of the function area.

Figure 10:
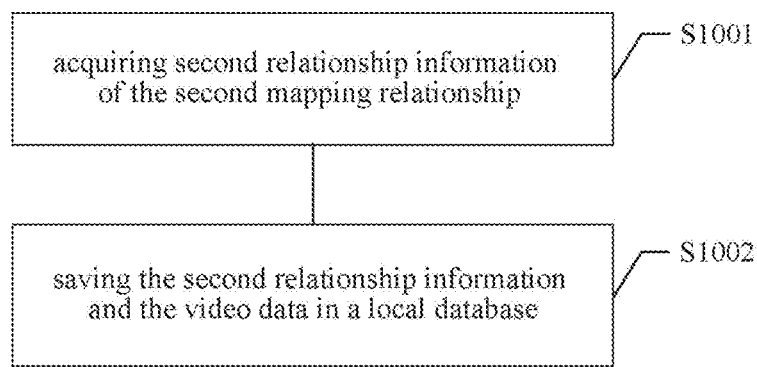
FIG. 10 schematically shows a schematic flowchart of a method for saving a second mapping relationship in a local database in one of exemplary embodiments of the present disclosure.

In an exemplary embodiment of the present disclosure, FIG. 10 shows a schematic flowchart of a method for saving a second mapping relationship in a local database. As shown in FIG. 10, the method includes at least the following steps: in step S1001, the second relationship information of the second mapping relationship is acquired. To reduce the amount of access to the server, the second mapping relationships of the video data can be uploaded to the local database. The second relationship information in the second mapping relationship is acquired, and the second relationship information is correspondence information between the time stamp of the image frame and the first mapping relationship of the image frame. In step S1002, the second relationship information and the video data are saved in the local database. The video data established with the second relationship information and the second relationship information are saved in the local database, so that the viewer end can query the second mapping relationship in the local database when decoding.

Figure 11:
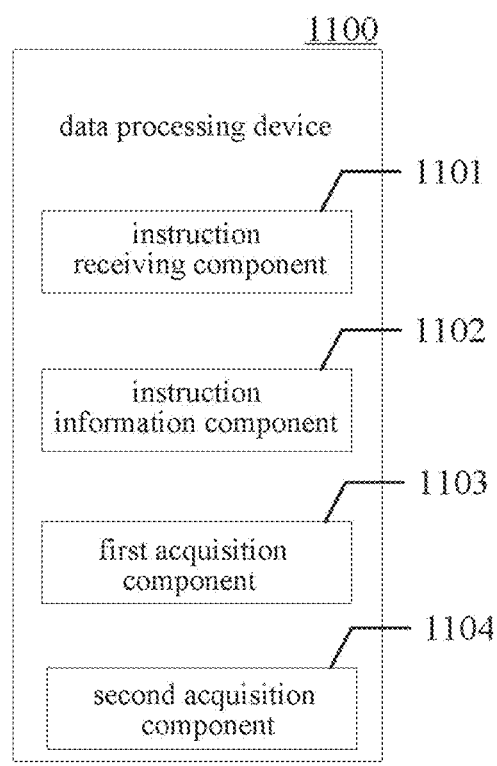
FIG. 11 schematically shows a schematic structural diagram of another data processing device in one of exemplary embodiments of the present disclosure.

In addition, in the exemplary embodiment of the present disclosure, a data processing device is also provided. FIG. 11 shows a schematic structural diagram of a data processing device. As shown in FIG. 11, the data processing device 1100 may include: an instruction receiving component 1101, an instruction information component 1102, a first acquisition component 1103, and a second acquisition component 1104.

The instruction receiving component 1101 is configured to determine image frames in video data, and receive a touch operation acting on the image frame; the instruction information component 1102 is configured to acquire a time stamp of the image frame, and touch position information of the touch operation acting on the image frame; the first acquisition component 1103 is configured to acquire a first mapping relationship corresponding to the time stamp based on a second mapping relationship; and the second acquisition component 1104 is configured to acquire coding information corresponding to the touch position information based on the first mapping relationship, and perform a function corresponding to a function area indicated by the coding information. The first mapping relationship includes a mapping relationship between the coding information of the function area and position information of the function area in the image frame, and the second mapping relationship includes a mapping relationship of the time stamp of the image frame.

The specific details of the above data processing device have been described in detail in the corresponding data processing method, so they will not be repeated here.

It should be noted that although several modules or units of the data processing device 1100 are described above in detail, such division of the modules or units is not mandatory. In fact, according to exemplary embodiments of the present disclosure, the features and functions of two or more modules or units described above may be embodied in one module or unit. Conversely, the features and functions of one module or unit described above can be further divided into multiple modules or units.

Figure 12:
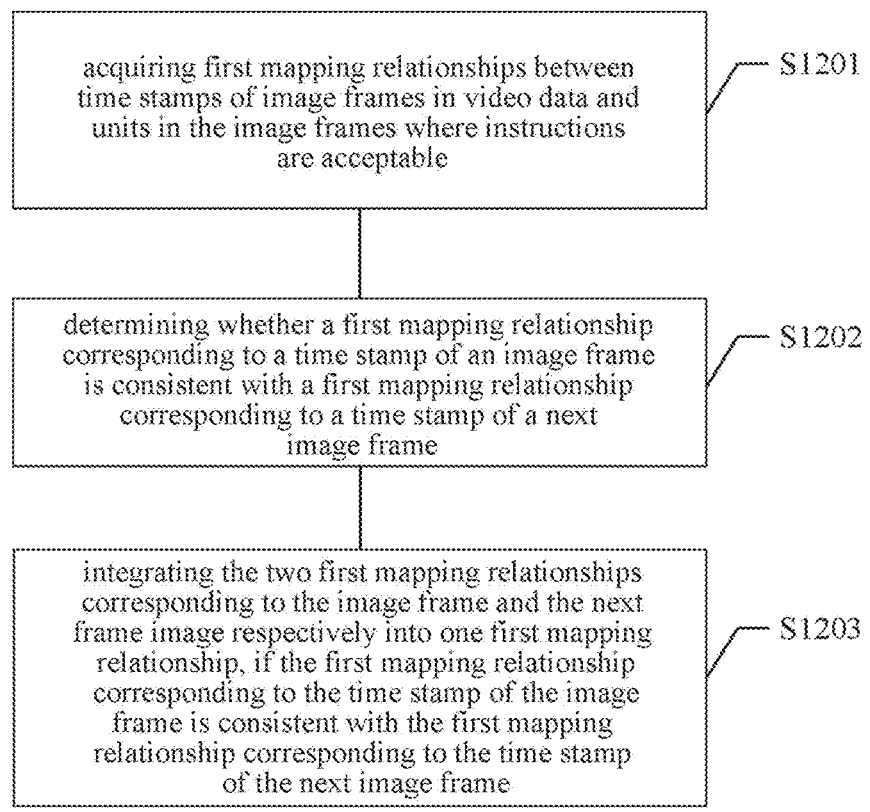
FIG. 12 schematically shows a schematic flowchart of still another data processing method in one of exemplary embodiments of the present disclosure.

In view of the problems in the related art, the present disclosure also proposes another data processing method. FIG. 12 shows a flowchart of the data processing method. As shown in FIG. 12, the data processing method includes at least the following steps.

In step S1201, first mapping relationships between time stamps of image frames in video data and areas on the image frames where instructions are acceptable are acquired.

In step S1202, it is determined whether a first mapping relationship corresponding to a time stamp of an image frame is consistent with a first mapping relationship corresponding to a time stamp of a next image frame.

In step S1203, if the first mapping relationship corresponding to the time stamp of the image frame is consistent with the first mapping relationship corresponding to the time stamp of the next image frame, the two first mapping relationships corresponding to the image frame and the next frame image respectively are integrated into one first mapping relationship.

In an exemplary embodiment of the present disclosure, by establishing a corresponding mapping relationship between the function area in the screen of the host end of the live streaming and the software function, the viewer end can perform the touch operation on the function area under the guidance of the anchor, thereby achieving the effect of enabling the corresponding function of the software. In addition, the server end of live streaming can determine whether a first mapping relationship corresponding to a time stamp of the image frame in the received video data is consistent with a first mapping relationship of a time stamp of the received next image frame. When the determination result indicates being consistent, the first mapping relationships of the two frames are merged. Through the integration operation of the server end, the established mapping relationship can be processed again, which not only saves server resources, but also reduces the query workload of the viewer end when decoding from the perspective of a third party. To a certain extent, the interaction between the viewer end and the host end is smoother and more convenient.

Each step of the data processing method will be described in detail below.

In step S1201, a first mapping relationship between the time stamp of the image frame in the video data and the area on the image frame that can receive the touch operation is acquired.

In the exemplary embodiment of the present disclosure, the video data itself is composed of successive image frames, one frame image is one still picture, and the successive image frames form a video. In the video data, if there are more frames in per second, the displayed picture will be smoother and more realistic; if there are fewer frames in per second, the video picture will be displayed incoherently, and the smoothness will be lower. For example, the video data may be composed of 60 image frames or 80 image frames. Both of them can display the same content, but there will be a clear difference in the smoothness of the video data. The method for determining the image frames of the video data may be to decompose the video data. This exemplary embodiment does not limit the number of image frames included in the video data. For example, if the video data includes 4 image frames, the video data can be decomposed into 4 image frames. In addition, the exemplary embodiment does not limit the format of the video data, which can be real-time live video data, or video files in mp4, avi, mkv, dvd, flv and other formats, or video data in other formats, or can also include single-channel gray-scale video data and three-channel color video data. The time stamp is usually a character sequence that uniquely identifies the time at a certain moment, and the time stamp of the image frame can uniquely identify the playing time of the image frame at a certain moment. When the image frames of the video data are determined, the time stamps of the image frames can be uniquely determined. The touch operation may be a click operation, a sliding operation, a press operation, etc. The present exemplary embodiment does not specifically limit the specific touch operation. The video data is decomposed to acquire the image frames, and at the same time, the first mapping relationship between the time stamp of the image frame and the receivable touch operation is acquired. The first mapping relationship includes the mapping relationship between the coding information of the function area and the position information of the area that can receive the touch operation in the image frame. The form of the first mapping relationship may be a mapping set R ((x1, y1, width1, height1)→code1, (x2, y2, width2, height2)→code2, . . . ) of the function area and the coding information. The position information of the area that can receive the touch operation can be determined by the screen coordinate system. The screen coordinate system takes the lower left corner of the screen as the origin and takes the pixel as a unit, and the coordinate axis extends towards the upper left without exceeding the maximum width and maximum height of the screen. The position information of the area that can receive the touch operation can be determined according to the corresponding pixel of the touch operation in the screen coordinate system. The position information may be position information of multiple touch points. For example, the position information of multiple position points is acquired to determine the position information of this area. Since these position points are established based on the screen coordinate system, the position information of each position point can be determined by the corresponding pixel value of the screen coordinate system, to determine the position information of this area that can receive the touch operation. For example, the position information of the plurality of position points is (1, 2), (1,3), (2,2) and (2,3), then it can be determined that the area that can receive the touch operation is a square with a side length of 1, the coordinates of the four points of which have been determined. The position information of the area that can receive the touch operation can be uniquely determined. The position information of the area that can receive the touch operation may be the position information of the touch area, and the position information of the touch area can be determined by the pixel values of the screen coordinate system. For example, the position information of the area that can receive the touch operation may be (1, 2, 3, 4), indicating that the touch area is a position area with a coordinate (1, 2) as a starting point, a width of 3, and a height of 4, and the unit of the position area is the pixel value. The position information of the area that can receive the touch operation may be determined according to the position information of (1, 2, 3, 4). The exemplary embodiment does not specifically limit the specific determination form of the position information of the area. The area that can receive the touch operation may be an area selected by the anchor during the live broadcast, or may be an area automatically set by the live broadcast software or the live broadcast server. The present exemplary embodiment does not specifically limit the specific determination method of the area, and does not specifically limit other attributes of the area such as the shape of the area.

In step S1202, it is determined whether a first mapping relationship corresponding to a time stamp of an image frame is consistent with a first mapping relationship corresponding to a time stamp of a next image frame.

In an exemplary embodiment of the present disclosure, since there is a one-to-one correspondence between the time stamp and the image frame, and each image frame is established with a corresponding first mapping relationship, there is a one-to-one correspondence between the time stamp and the first mapping relationship. However, since the division of the image frame may be too fine, there may be a case where there is no difference between the first mapping relationship corresponding to the time stamp of the image frame and the first mapping relationship corresponding to the time stamp of the previous image frame. To facilitate uploading and saving time and resources, it may be determined whether the first mapping relationship corresponding to the time stamp is consistent with the first mapping relationship corresponding to the time stamp of a next image frame according to the time stamp of the image frame. That is, it may be determined whether the coding information on the areas that can receive the touch operation in the two image frames is consistent. If the determination result indicates being inconsistent, it means that the functions included in the two image frames are inconsistent, and the two first mapping relationships can be saved.

In step S1203, if the first mapping relationship corresponding to the time stamp of the image frame is consistent with the first mapping relationship corresponding to the time stamp of the next image frame, the two first mapping relationships corresponding to the image frame and the next frame image respectively are integrated into one first mapping relationship.

In an exemplary embodiment of the present disclosure, if the first mapping relationship corresponding to the time stamp of the image frame is consistent with the first mapping relationship corresponding to the time stamp of the next image frame, it means that the only the time stamps of two image frames are changed. The functions included in the two image frames have not been changed. To save the capacity of the server, the two first mapping relationships of the image frame and the next image frame can be integrated, and only one first mapping relationship is saved. In this case, the two time stamps correspond to the same first mapping relationship, which can also facilitate the query of the viewer end in the server to save query time and respond to the function unlocking demand of the viewer end faster.

Figure 13:
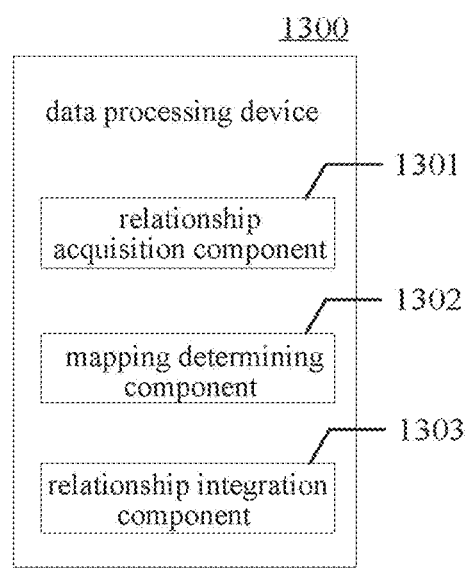
FIG. 13 schematically shows a schematic structural diagram of still another data processing device in one of exemplary embodiments of the present disclosure.

In addition, in the exemplary embodiment of the present disclosure, a data processing device is also provided. FIG. 13 shows a schematic structural diagram of a data processing device. As shown in FIG. 13, the data processing device 1300 may include: a relationship acquisition component 1301, a mapping determining component 1302, and a relationship integration component 1303.

The relationship acquisition component 1301 is configured to acquire first mapping relationships between time stamps of image frames in video data and areas on the image frames where touch operations are acceptable; the mapping determining component 1302 is configured to determine whether a first mapping relationship corresponding to a time stamp of an image frame is consistent with a first mapping relationship corresponding to a time stamp of a next image frame; and the relationship integration component 1303 is configured to integrate the two first mapping relationships corresponding to the image frame and the next frame image respectively into one first mapping relationship, if the first mapping relationship corresponding to the time stamp of the image frame is consistent with the first mapping relationship corresponding to the time stamp of the next image frame.

The specific details of the above data processing device have been described in detail in the corresponding data processing method, so they will not be repeated here.

It should be noted that although several modules or units of the data processing device 1300 are described above in detail, such division of the modules or units is not mandatory. In fact, according to exemplary embodiments of the present disclosure, the features and functions of two or more modules or units described above may be embodied in one module or unit. Conversely, the features and functions of one module or unit described above can be further divided into multiple modules or units.

The data processing method in the embodiments of the present disclosure will be described in detail below in conjunction with an application scenario.

Figure 14:
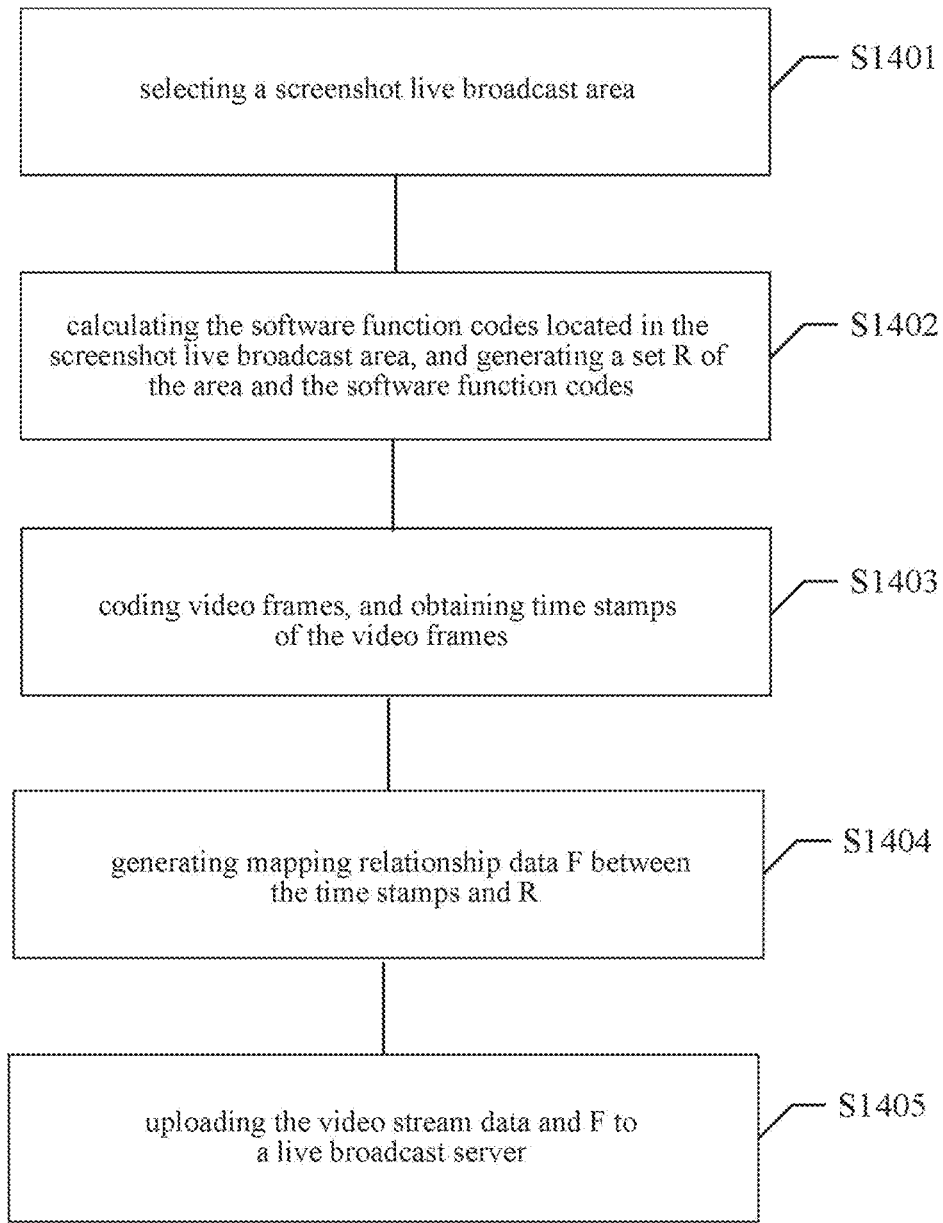
FIG. 14 schematically shows a schematic flowchart of a data processing method corresponding to an anchor end in one of exemplary embodiments of the present disclosure.
Figure 15:
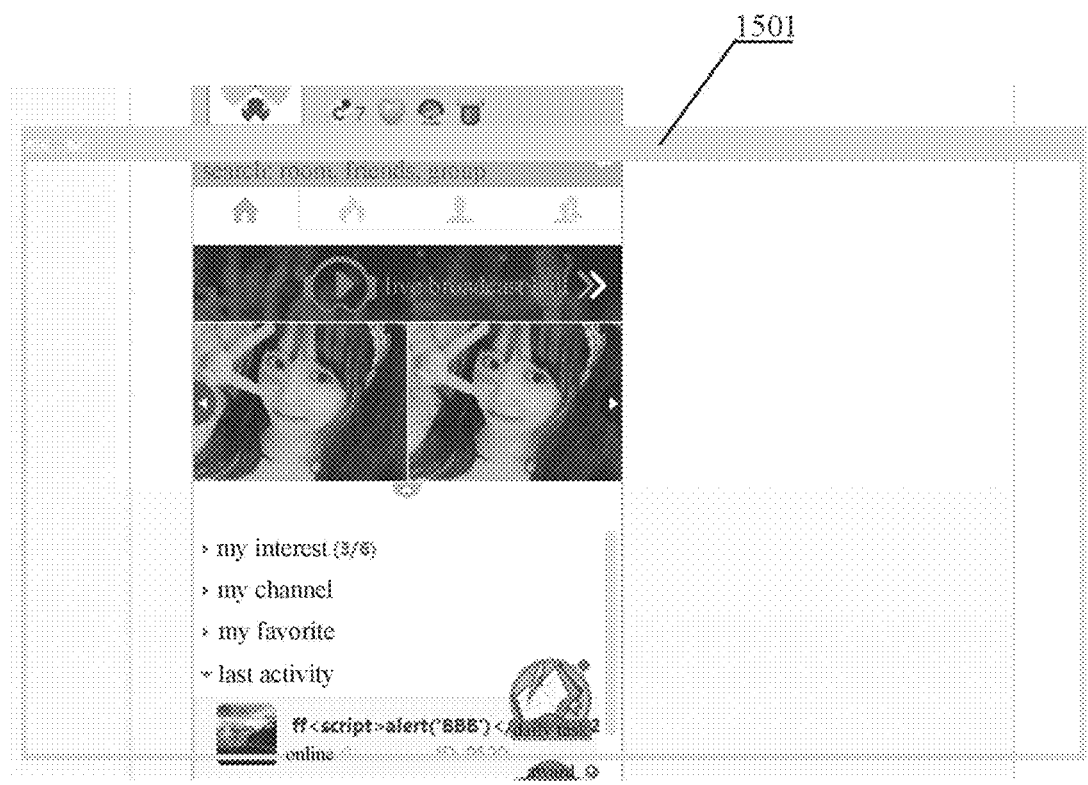
FIG. 15 schematically shows a schematic diagram of an application interface for generating a video image by capturing a screen in one of exemplary embodiments of the present disclosure.

FIG. 14 shows a schematic flowchart of a data processing method provided at an anchor end in the present disclosure. As shown in FIG. 14, the method includes at least the following steps: in step S1401, a video image is generated using a screenshot area, and a coding manner performed in the video image is a commonly used broadcast manner. FIG. 15 shows a schematic diagram of an application interface for generating a video image by capturing a screen. As shown in FIG. 15, the area corresponding to 1501 is the area where the screen is captured for live broadcast. After selecting the area for the live broadcast by capturing the screen, a rectangular area based on the screen coordinate system can be acquired, and then the rectangular area is placed in the live broadcast area, and the functions contained in the rectangular area are mapped to the live broadcast area. In step S1402, the live streaming area is sent to the software where the rectangular area is located. The software can return the first mapping relationship R ((x1, x1, y1, width1, height1)→code1, (x2, y2, width2, height2)→code2, . . . ) composed of each function area in the live broadcast area and the position information and coding information of the function area. Moreover, the position information of the function area can be converted from the position information based on the screen coordinate system to the relative position information of the live broadcast area. For example, the position information of the function area is (1, 1, 4, 4), and the relative position information of the live broadcast area converted from the coordinate information may be (0, 0, 4, 4). This exemplary embodiment does not specifically limit the specific conversion manner of relative position information, as long as the manner facilitates the determination of the position of the function area in the live broadcast area. In step S1403, when the video data is coded, each video frame generated will simultaneously generate a time stamp corresponding to the video frame. The time stamp is a necessary condition for the viewer end to watch the live video normally. In step S1404, a one-to-one correspondence is established between the acquired time stamp and the first mapping relationship to acquire a second mapping relationship. In step S1405, the video data and the second mapping relationship are uploaded to the server. The types of the server may include a personal computer (PC) server, a mainframe, a minicomputer, and may also include a cloud server. The exemplary embodiment does not specifically limit the types of the server. Since the live video is generally coded at an efficiency of 16-30 frames per second, but the software in the screenshot area generally does not move very quickly, therefore, the operation of uploading to the server can be optimized as follows: only uploading the second mapping relationship of the function area different from the function area in the previous image frame. For example, if the timestamps of the video data are 1-100, the video images are the same, and the first mapping relationships are also the same, then only the second mapping relationship of the time stamp 1 is uploaded, and the second mapping relationships of the image frames with the time stamps 2-100 are not uploaded. If the first mapping relationship is different from the first mapping relationship of $1^{st}$ frame when the time stamp is 101, the second mapping relationship of the $101^{th}$ frame is uploaded at this time.

After the host end uploads the functionally coded video data to the server end, the viewer end must perform the corresponding decoding process before performing the software function by clicking the corresponding position of the video picture while watching the video.

Figure 16:
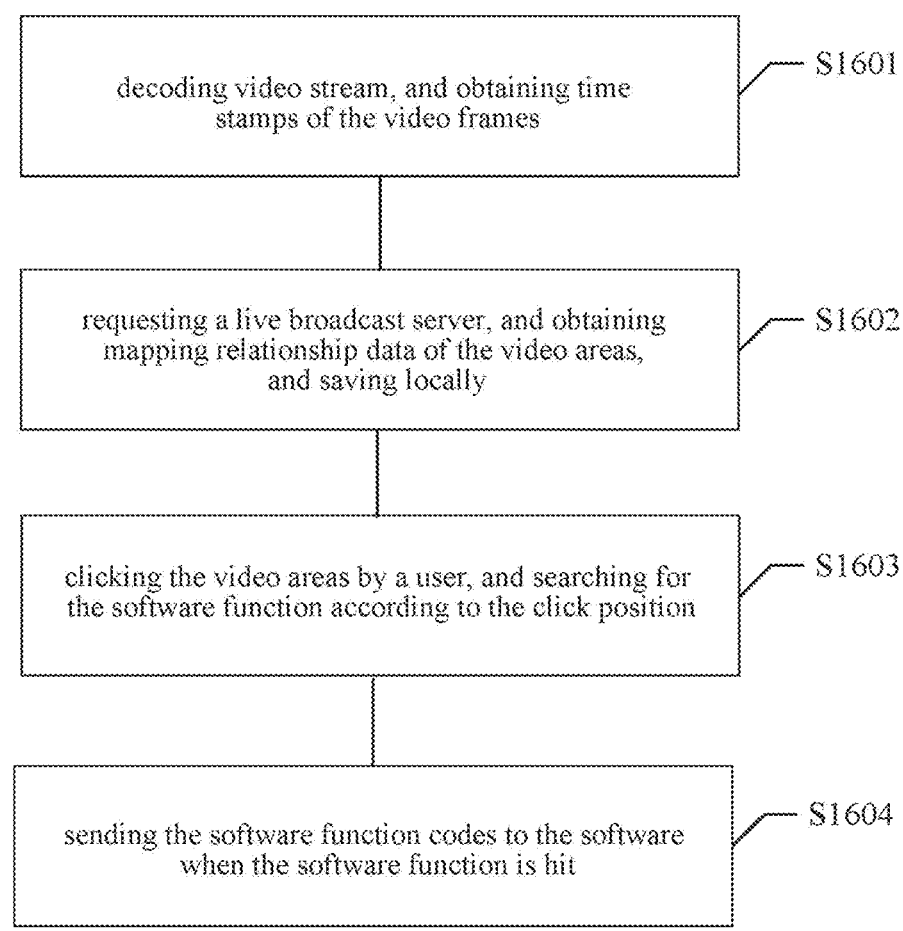
FIG. 16 schematically shows a schematic flowchart of a data processing method corresponding to a viewer end in one of exemplary embodiments of the present disclosure.

FIG. 16 shows a schematic flowchart of a data processing method of the present disclosure at a viewer end. As shown in FIG. 16, the method includes at least the following steps: in step S1601, when the viewer end decodes the video data, the time stamp of each image frame and the video data can be acquired. In step S1602, the time stamp of the image frame is used to request the server. If the second mapping relationship corresponding to the time stamp exists in the server, the second mapping relationship is delivered to the viewer end. In addition, an optimization method is provided: the second mapping relationship corresponding to the subsequent time stamp after this time stamp is simultaneously delivered to the viewer end, so as to avoid too many viewer ends from initiating requests and occupying concurrent resources of the server. After receiving the data returned by the server, the viewer end can save it in the local database. In step S1603, when the viewer sends a touch operation to the live broadcast area, the time stamp of the image frame where the viewer initiates the touch operation and the touch position information of the touch operation can be acquired. Based on the second mapping relationship, the first mapping relationship may be determined according to the time stamp, to determine the function area hit by the touch operation. For example, the first mapping relationship is (x i, y i, width i, height i)→code i, and the coding information code i can be determined according to the touch position information. Moreover, if the touch operation misses the function area, a prompt message of missing may be returned. In step S1604, the viewer end returns the coding information to the software. After receiving the corresponding coding information, the software executes the corresponding software function, for example, the software function corresponding to the "daily task", such as daily attendance, punching the clock, or other corresponding software functions.

In order to facilitate the systemization of the data processing method provided by the present disclosure, the present disclosure also provides a data processing system. The functions and corresponding operations performed by each module in the system will be described in detail below.

Figure 17:
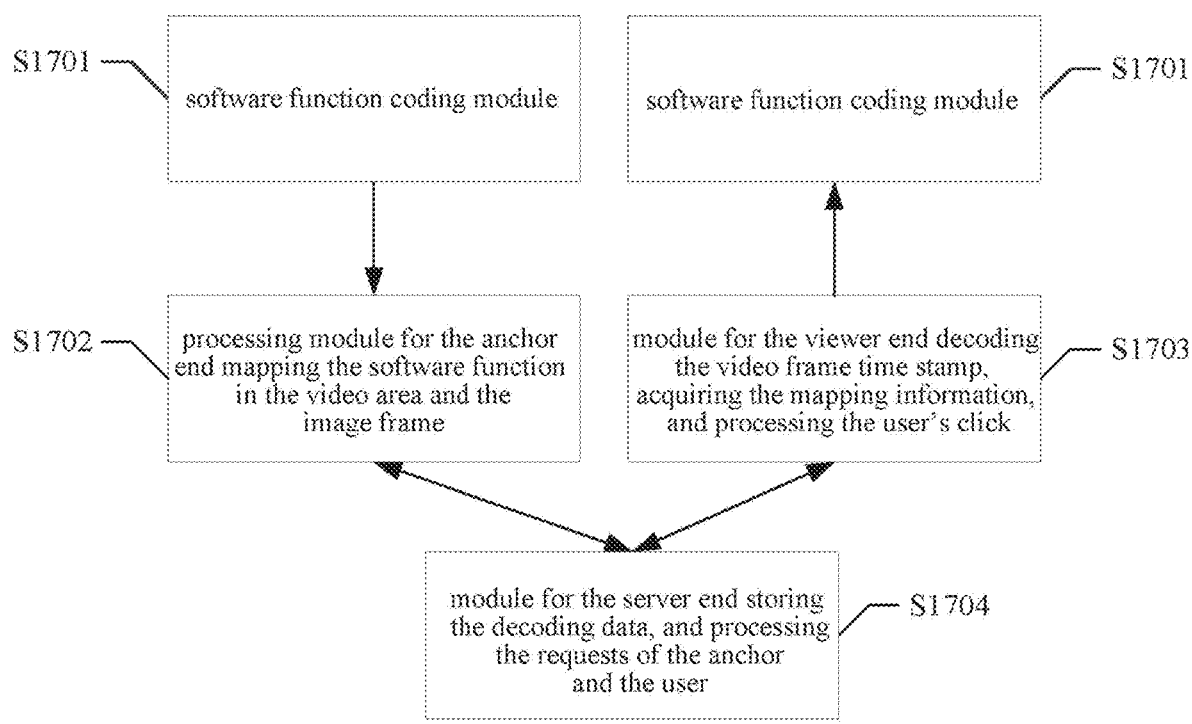
FIG. 17 schematically shows a schematic flowchart of a data processing system in one of exemplary embodiments of the present disclosure.

FIG. 17 shows a data processing system provided by the present disclosure. As shown in FIG. 17, the data processing system includes a software function coding module 1701, a processing module 1702 for the anchor end mapping the software function in the live broadcast area and the image frame, a module 1703 for the viewer end decoding the time stamp, acquiring the first mapping relationship, and processing the viewer end's click, and a module 1704 for the server end storing the decoding information, and processing the requests of the anchor end and the viewer end. The module 1704 for the server end storing the decoding information, and processing the requests of the anchor end and the viewer end includes a module for storing and retrieving the coding information, and a module for processing a request. The software function coding module 1701 is configured to code the function area where the software can receive touch operations, provide an interface for querying software function coding information based on a point or area of the screen coordinate system, and execute the corresponding software function when receiving a request to execute the software function coding information. The processing module 1702 for the anchor end mapping the software function in the live broadcast area and the image frame is configured to query the module 1701 for the first mapping relationship of the function area located in the live broadcast area, and generate a second mapping relationship of the video data when acquiring the time stamp after coding the video, and upload the relationship set of the second mapping relationship to the server module. The module 1703 for the viewer end decoding the time stamp, acquiring the first mapping relationship, and processing the viewer end's click is configured to query whether the corresponding second mapping relationship exists in the local database after decoding the video data to acquire the time stamp. If it exists, the first mapping relationship is returned directly to the viewer end; if it does not exist, a request to query the first mapping relationship corresponding to the time stamp is sent to the server module. If the second mapping relationship corresponding to the time stamp is queried, the corresponding first mapping relationship is directly returned, and the server module returns the second mapping relationship corresponding to the subsequent time stamp starting from this time stamp to the viewer end simultaneously, and the viewer end saves the second mapping relationship in the local database; or when the corresponding second mapping relationship is not queried, the feedback information that the second mapping relationship corresponding to the timestamp is not queried is returned. When the viewer end sends a touch operation such as a click operation, the time stamp of the click operation can be acquired, and the corresponding first mapping relationship can be acquired by calculating the mapping relationship set of the second mapping relationship in the local database. When the first mapping relationship is acquired, it is calculated whether the first mapping relationship includes the software function area corresponding to the touch position information of the touch operation. When it is included, the corresponding software function coding information is returned and the coding information is sent to the module 1701 to perform the corresponding function. The module for storing and retrieving the coding information in the module 1704 for the server end storing the decoding information, and processing the requests of the anchor end and the viewer end is configured to store, in the server end, the mapping relationship set of the second mapping relationship of the time stamp of the video data from the anchor end and the time stamp of the viewer end sending the request, and retrieve the set of the corresponding second mapping relationship and the subsequent second mapping relationship; the module for processing a request in the module 1704 for the server end storing the decoding information, and processing the requests of the anchor end and the viewer end is configured to process data requests from the anchor end and the viewer end on the server end of the video, and return the processing results.

In addition, in the exemplary embodiment of the present disclosure, an electronic device capable of implementing the above method is also provided.

The electronic device 1800 according to such an embodiment of the present disclosure is described below with reference to FIG. 18. The electronic device 1800 shown in FIG. 18 is only an example, and should not bring any limitation to the functions and use scope of the embodiments of the present disclosure.

Figure 18:
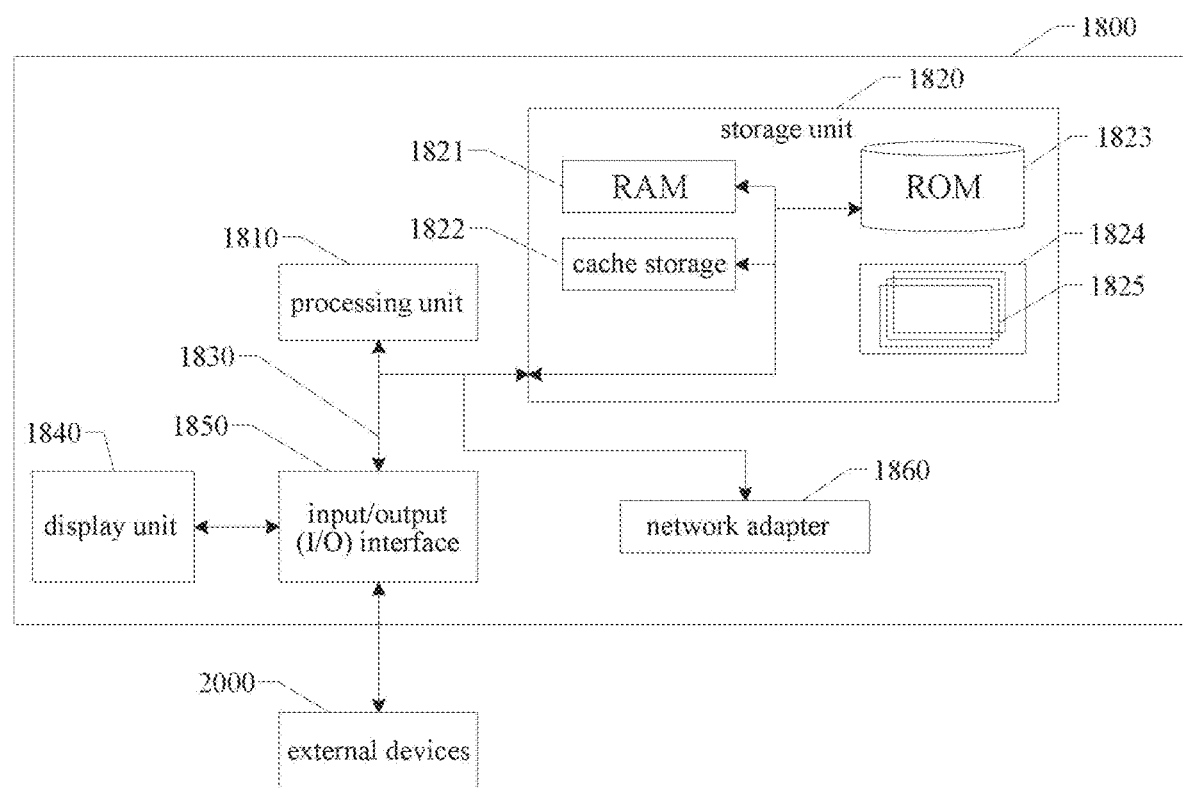
FIG. 18 schematically shows an electronic device for implementing a data processing method in one of exemplary embodiments of the present disclosure.

As shown in FIG. 18, the electronic device 1800 is shown in the form of a general-purpose computing device. The components of the electronic device 1800 may include, but not limited to, at least one processing unit 1810, at least one storage unit 1820, a bus 1830 connecting different system components (including the storage unit 1820 and the processing unit 1810), and a display unit 1840.

The storage unit stores program codes, and the program codes can be executed by the processing unit 1810, so that the processing unit 1810 executes steps of various exemplary embodiments according to the present disclosure described in the "detailed description" section of the present specification.

The storage unit 1820 may include a readable medium in the form of a volatile storage unit, such as a random access storage unit (RAM) 1821 and/or a cache storage unit 1822, and may further include a read-only storage unit (ROM) 1823.

The storage unit 1820 may further include a program/utility tool 1824 having a set (at least one) of program modules 1825. Such program modules 1825 include, but not limited to, an operating system, one or more application programs, other program modules, and program data. Each or some combination of these examples may include an implementation of a network environment.

The bus 1830 may be one or more of several types of bus structures, including a memory unit bus or a memory unit controller, a peripheral bus, a graphics acceleration port, a processing unit, or a local area bus using any bus structure in a variety of bus structures.

The electronic device 1800 may also communicate with one or more external devices 2000 (such as a keyboard, a pointing device, a Bluetooth device, etc.), and may also communicate with one or more devices that enable a user to interact with the electronic device 1800, and/or may also communicate with any device (such as a router, a modem, or the like) that enables the electronic device 1800 to communicate with one or more other computing devices. Such communication can be performed through an input/output (I/O) interface 1850. Moreover, the electronic device 1800 may also communicate with one or more networks (such as a local area network (LAN), a wide area network (WAN), and/or a public network, such as the Internet) through the network adapter 1860. As shown in the figure, the network adapter 1860 communicates with other modules of the electronic device 1800 through the bus 1830. It should be understood that although not shown in the figure, other hardware and/or software modules may be used in conjunction with the electronic device 1800, including but not limited to: microcodes, device drivers, redundant processing units, external disk drive arrays. RAID systems, tape drives and data backup storage systems, or the like.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product runs on a terminal device, the program codes are used to cause the terminal device to perform the steps according to various exemplary embodiments of the present disclosure described in the above-mentioned "detailed description" section.

Figure 19:
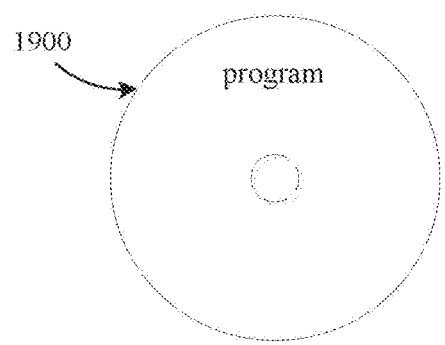
FIG. 19 schematically shows a computer-readable storage medium for implementing a data processing method in one of exemplary embodiments of the present disclosure.

Referring to FIG. 19, a program product 1900 for implementing the above method according to an embodiment of the present disclosure is described. The program product can adopt a portable compact disc read-only memory (CD-ROM) and include program codes, and may be executed on a terminal device, such as a personal computer. However, the program product of the present disclosure is not limited thereto. In the present document, the readable storage medium may be any tangible medium containing or storing a program, and the program may be used by an instruction execution system, device, or apparatus, or the program may be used in combination with an instruction execution system, device, or apparatus.

The program product may employ any combination of one or more readable mediums. The readable medium may be a readable signal medium or a readable storage medium. The readable storage medium may be, for example, but not limited to, an electronic, magnetic, optical, electromagnetic, infrared, or semiconductor system, device, or apparatus, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, device, or apparatus, or that is used in combination with an instruction execution system, device, or apparatus.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet connection provided by the Internet service providers.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A data processing method, applied to a host end of a live streaming, wherein the method comprises:
   determining an image frame of video data, and acquiring position information of a function area located in the image frame;
   acquiring coding information of the function area, and establishing a first mapping relationship between the coding information and the position information;
   acquiring a time stamp of the image frame, and establishing a second mapping relationship between the time stamp and the first mapping relationship, and
   uploading the video data and the mapping relationship to a server;
   wherein uploading the video data and the mapping relationship to the server comprises:
   determining whether differences exist between a first mapping relationship corresponding to a time stamp of an image frame and a first mapping relationship corresponding to a time stamp of a previous image frame; and
   in responding to determining that differences exist between the first mapping relationship corresponding to the time stamp of the image frame and the first mapping relationship corresponding to the time stamp of the previous image frame, uploading a second mapping relationship corresponding to the time stamp of the image frame to the server.

2. The data processing method according to claim 1, wherein after establishing the second mapping relationship between the time stamp and the first mapping relationship, the method further comprises:
   acquiring a mapping relationship set of second mapping relationships corresponding to image frames of the video data respectively;
   coding the video data and the mapping relationship set to acquire data mapping coding information; and
   uploading the data mapping coding information to a server.

3. The data processing method according to claim 2, wherein after establishing a second mapping relationship between the time stamp and the first mapping relationship, the method further comprises:
   acquiring a mapping relationship set of second mapping relationships corresponding to image frames of the video data respectively; and
   uploading the video data and the mapping relationship set to the server respectively.

4. The data processing method according to claim 1, wherein acquiring position information of the function area located in the image frame comprises:
   determining a plurality of position points corresponding to the function area in the image frame; and
   acquiring position information of the plurality of position points.

5. The data processing method according to claim 1, wherein acquiring position information of the function area located in the image frame comprises:
   determining a position area corresponding to the function area in the image frame; and
   acquiring the position information of the position area.

6. A data processing method, applied to a viewer end of live streaming, wherein the method comprises:
   determining an image frame in video data, and receiving a touch operation acting on the image frame;
   acquiring a time stamp of the image frame, and touch position information of the touch operation acting on the image frame;
   acquiring a first mapping relationship corresponding to the time stamp based on a second mapping relationship; and
   acquiring coding information corresponding to the touch position information based on the first mapping relationship, and performing a function corresponding to a function area indicated by the coding information, wherein the first mapping relationship comprises a mapping relationship between the coding information of the function area and position information of the function area in the image frame, and the second mapping relationship comprises a mapping relationship between the time stamp of the image frame;
   wherein acquiring a first mapping relationship corresponding to the time stamp based on a second mapping relationship comprises:
   determining whether there is the first mapping relationship corresponding to the time stamp saved in the local database; and
   in responding to determining there is no first mapping relationship corresponding to the time stamp saved in the local database, uploading the time stamp to a server to acquire the first mapping relationship corresponding to the time stamp from the server.

7. The data processing method according to claim 6, wherein before determining the image frame in video data and receiving a touch operation acting on the image frame, the method further comprises:
   acquiring second relationship information of the second mapping relationship; and saving the second relationship information and the video data in a local database.

\* \* \* \* \*